United States Patent [19]

Clark, Jr.

[11] Patent Number: 4,901,757

[45] Date of Patent: Feb. 20, 1990

[54] ONE WAY VALVE

[76] Inventor: Robert W. Clark, Jr., 2232 W. Joan de Arc Ave., Phoenix, Ariz. 85029

[21] Appl. No.: 299,419

[22] Filed: Jan. 23, 1989

[51] Int. Cl.[4] .............................................. F16K 15/02
[52] U.S. Cl. ................................ 137/496; 137/516.11; 137/516.29; 137/533.17
[58] Field of Search .................... 137/494, 496, 516.11, 137/516.15, 516.23, 516.27, 516.29, 533.17, 533.27, 538

[56] References Cited

U.S. PATENT DOCUMENTS

| 865,631 | 9/1907 | Cotter | 137/533.17 |
| 1,292,962 | 1/1919 | Pocock | 137/533.17 X |
| 2,481,018 | 9/1949 | Johnson | 137/516.15 X |
| 2,655,173 | 10/1953 | Overbeke | 137/494 X |
| 3,344,806 | 10/1967 | Schultz | 137/494 |
| 3,805,826 | 4/1974 | Westerhoff | 137/516.11 |
| 4,176,680 | 12/1979 | Launay | |

FOREIGN PATENT DOCUMENTS 756162 8/1956 United Kingdom ................ 137/538

Primary Examiner—Robert G. Nilson
Attorney, Agent, or Firm—Edward W. Hughes

[57] ABSTRACT

A one way valve includes a valve housing. A valve compartment is located with the valve housing. An inlet and an outlet port are mounted in the valve housing to provide communication with the valve compartment. The inlet port has an inner cylindrical portion extending into the valve compartment. A cup shaped valve cap is movably mounted on the inner portion of the inlet port between two positions. One in which orifices in the inner portion of the inlet port are uncovered to open the valve, and a second position in which the free edge of the valve cap engages a seal mounted in the valve compartment and surrounding the inner portion of the inlet port to close the valve. When the valve is closed the inner portion of the inlet port is completely enclosed within the valve cap. Movement of the valve cap to open the valve is limited by the cap engaging a portion of the outlet port which projects into the valve compartment.

7 Claims, 1 Drawing Sheet

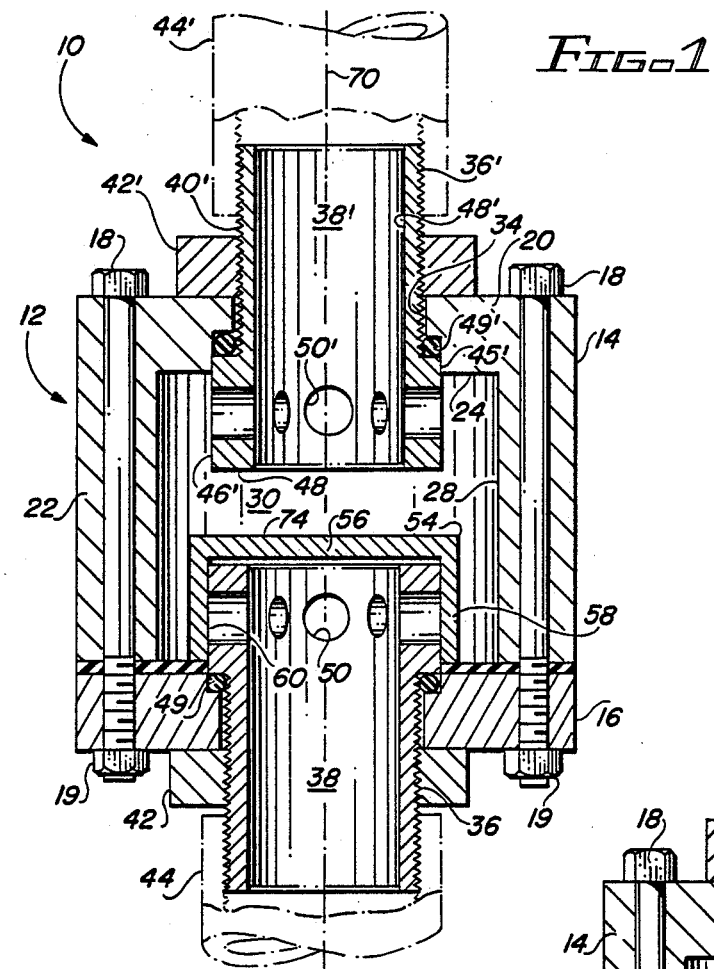
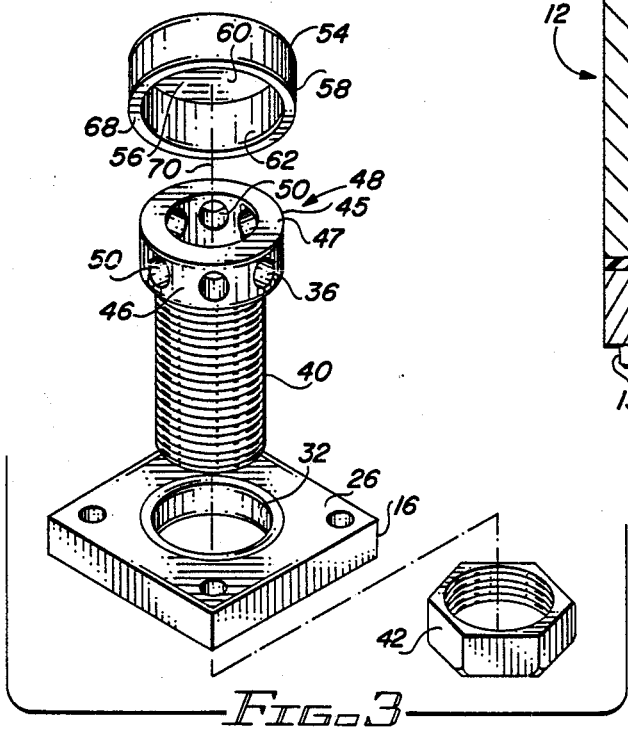
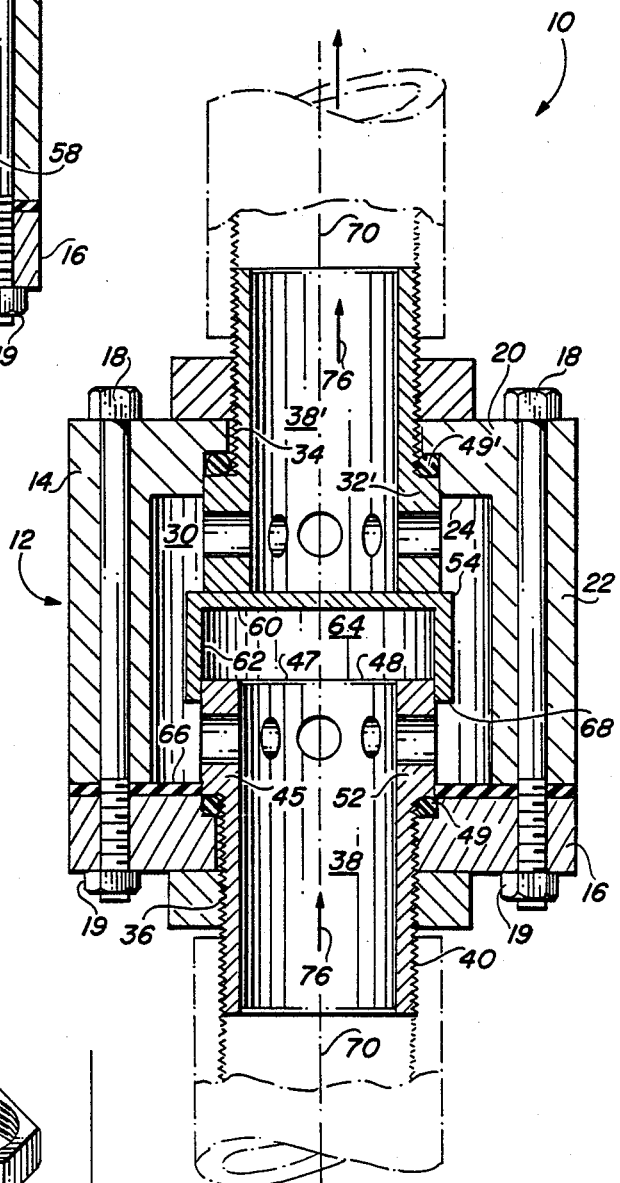
FIG-1
FIG-3
FIG-2

ONE WAY VALVE

BACKGROUND OF THE INVENTION (1.) Field of the Invention

This invention is in the field of valves. This invention relates more specifically to one way valves commonly referred to as check valves.

(2.) Description of the Prior Art

The prior art in the field of one way, or check, valves has involved the used of balls which respond to differences in direction of flow to open or to close round orifices, of flappers which respond in the same manner to open or to close orifices, and of spring loaded balls or flappers. Spring loaded valves are used to increase the speed with which such valves close. Solenoid powered valves may also be used for this purpose. A major problem with ball valves is the the fact that the surfaces which provide the seals that prevent reverse flow are also the surfaces subject to frictional wear as the valves open and close. Both ball and flapper valves also subject the sealing surfaces to wear, or erosion, from the flow of the fluid itself, because in both cases the surfaces that seal, or close, the valve are directly exposed to the flow of fluid through the valves. Spring loaded valves have a break pressure that must be overcome before flow in the desired direction can occur. Solenoid valves, especially those activated by pressure differences, are costly. This invention overcomes the defects of the prior art one way valves by a new and unique design.

SUMMARY OF THE INVENTION

The present invention provides a unique one way valve that has only a single moving part, a valve cap. The surface of the cap subject to frictional wear is not the surface of the cap which engages a seal to prevent reverse flow. The surface of the valve cap and the seal that surface engages are not subject to erosion by the direct flow of fluids through the valve.

It is, therefore, an object of this invention to provide a long lived, fast acting one way valve that is responsive to small pressure differences with the ability to control the direction of fluid flow through the valve even when pressure differences are large.

It is a further object of this invention to provide a one way valve that is not restricted for use with fluids having pressure differences within a limited range.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected with departing from the spirit and scope of the novel concepts of the disclosure, and in which:

FIG. 1 is a longitudinal sectional view of a one way valve embodying this invention and in which the valve is closed.

FIG. 2 is a sectional view, similar to that of FIG. 1 in which the valve is open.

FIG. 3 is an exploded view at a reduced scale of an inlet port, valve cap and cover plate of the one way valve of this invention, with the valve tilted to illustrate better its shape.

DESCRIPTION OF THE PREFERRED EMBODIMENT

In FIG. 1, one way, or check, valve 10 includes a valve housing 12. Valve housing 12, in the preferred embodiment, has a body member 14 which is secured to cover plate member 16 by four sets of bolts 18 and nuts 19. Body member 14 has a base 20 and side wall 22 which is integral with base 20. The inner surface 24 of base 20 is substantially planar as is the inner surface 26 of cover plate 16. The inner surface 28 of side wall 22 of body member 14 is substantially cylindrical. The inner surfaces 24, 26, and 28 of the members 14, 16 of valve housing 12 form valve space, or chamber, 30.

Circular opening 32 is formed in cover plate 16 and circular opening 34 is formed in base 20 of body member 14. Mounted in opening 32 of cover plate 16 is port 36. A substantially identical port 36' is similarly mounted in opening 34 in base 20. In the preferred embodiment port 36 functions as an inlet port and port 36' functions as an outlet port of valve 10. Port 36 has a passage 38 so that fluids can flow through port 36 into, or out of, valve space 30. Port 36 has a threaded portion 40 which in cooperation with nut 42 secures port 36 firmly to cover plate 16. Threaded portion 40 also facilitates connecting valve 10 to a source of fluid through pipe 44, for example.

Inner cylindrical portion 45 of port 36 projects into valve space 30. The outer surface 46 of portion 45 is substantially cylindrical and has a greater diameter than that of threaded portion 40. The outer surface 47 of face 48 of cylindrical portion 45 is substantially planar. When port 36 is secured to cover plate 16, O-ring 49 is positioned between inner portion 45 of port 36 and cover plate 16 to prevent fluid in valve space 30 from leaking out of space 30 through minute passages that may exist between port 36 and cover plate 16, for example. A plurality of orifices 50 are formed in the wall 52 of inner portion 45. Outlet port 36' is of substantially the same construction and size as port 36, and the manner of mounting port 36' in base 20 is the same as that used to mount port 36 in cover plate 16.

Cylindrical cup shaped valve cap 54 has a base 56 and cylindrical side wall 58. The inner planar surface 60 of base 56 and the inner cylindrical surface 62 of side wall 58 define a cylindrical space 64. The diameter of space 64 is slightly greater than the outer diameter of surface 46 of inner portion 45 of port 36. The depth of cylindrical space 64 is greater than the height, or distance, that inner portion 45 projects above seal 66 which is mounted on the inner planar surface 26 of cover plate 16. The free edge, or free surface, 68 of valve cap 54 thus is able to contact a flat, or planar, surface of seal 66 to prevent reverse flow of fluid through inlet port 36.

In the preferred embodiment, valve space 30 is substantially symmetrical with respect to axis of symmetry 70 of valve housing 12. Ports 36, 36' are preferably mounted on housing 12 so as to be substantially symmetric with respect to axis 70. The distance between the outer surfaces 47, 47' of the faces 48, 48' of ports 36, 36' is such that valve cap 54 when positioned, or mounted, on inner portion 45 of port 36, as illustrated in FIGS. 1 and 2, always has part of inner portion 45 located within valve cap 54 when valve 10 is open, as illustrated in FIG. 2. Seal 66 can be extended to between side wall 22 and cover plate 16 to prevent fluid from escaping from, or entering space, 30 through that joint, or seam.

In FIGS. 1-3, the axis of symmetry 70 of housing 12 is illustrated as being oriented vertically with port 36, being the inlet port and being located below outlet port 36'. When valve 10 has this orientation, when fluid pressure acting upon the inner surfaces of valve cap 54 exceed the fluid pressure acting upon the outer surfaces of valve cap 54 by an amount greater than the weight of cap 54, cap 54 moves from its closed position, as illustrated in FIG. 1, until the outer surface 74 of base 56 of cap 54 contacts surface 47' of port 36' as shown in FIG. 2. This movement of valve cap 54 uncovers orifices 50 in inlet port 36 and permits fluid to flow through passage 38 and orifices 50 of inlet port 36 and between the inner surface 28 of side wall 22 of body member 14 and valve cap 54 and through the always unobstructed orifices 50' and passage 38' of outlet port 36' as shown by the arrows 76 in FIG. 2. Because movement of cap 54 is stopped by planar surface 74 acting against flat, or planar, surface 47' the magnitude of the pressure difference which causes cap 54 to move and the speed of movement does not change the magnitude of the pressure difference necessary to effect a reversal of that movement.

When fluid pressure acting upon the outer surface of valve cap 54 plus the weight of cap 54 exceed the fluid pressure acting upon the inner surfaces of valve cap 54, cap 54 moves until the free edge, or surface, 68 of cap 54 rests against the upper substantially flat surface of seal 66, at which point movement of cap 54 stops. Reverse flow of the fluid through valve 10 is prevented by the pressure exerted by surface 68 of cap 54 against seal 66. The greater the pressure difference, the better the sealing action. Since the sealing action is provided by the flat, or planar, surface 68 of valve cap 45 acting against a flat surface of seal 66, the magnitude of the pressure difference which causes cap 45 to move and the speed of that movement does not change the pressure difference necessary to affect a reversal of that movement.

Thus, the present invention provides a one way, or check, valve responsive to pressure differences which exceed the weight of the sliding cap 54 i.e., its mass times acceleration do to gravity, or any other acceleration to which valve 10 is subjected, having a component parallel to axis of symmetry 70, (less than 1 psi. in the preferred embodiment) and which can be employed regardless of the magnitudes of the pressure differences to which valve 10 may be subjected as long as the materials from which valve 10 is constructed are capable of withstanding the maximum pressure to be encountered. The preferred embodiment was fabricated from aluminum.

Movement of cap 54 on inlet port 36 causes frictional wear on the inner surface 62 of cap 54 and on the the exposed outer surface 46 of portion 45 of port 36. However, since neither of these surfaces is involved in the sealing function, such frictional wear does not interfere with proper operation of valve 10. It should also be noted that the flow of fluid out of orifices 50 into valve space 30 is not directed at the upper surface of seal 66 or at the free edge, or surface, 68 of cap 54. As a result, the valve of the present invention provides long term reliable service.

The size and shape of orifices 50 and 50' in ports 36, 36' provide unobstructed areas which is greater the the area of passage 38, or 38' of ports 36, 36'. Likewise, the area between cap 45 and the inner surface 24 of body member 14 is also made larger than the area of passage 38, or 38'. This minimizes the impedance of valve 10 to the flow of fluid through valve 10 when valve 10 is open. Additionally, as illustrated in FIGS. 1 and 2, valve cap 45 has only to move a short distance, one half inch in the preferred embodiment, to cause valve 10 to change from being fully open, its position as illustrated in FIG. 2, to its being fully closed, its position as illustrated in FIG. 1. The short distance that valve cap 45 has to move from its fully open to its fully closed position, or condition, permits very fast cycling of valve 10 between these two conditions, or states.

Orientation of valve 10 is not critical to its operation, and which of the two ports 36, or 36' is the inlet port depends on which port cap 45 is positioned around.

It should be evident that various modifications can be made to the described embodiment without departing from the scope of the present invention.

What is claimed is:

1. A one way valve comprising:
   a valve housing having inner wall means forming a valve chamber;
   an inlet port mounted in the housing, a portion of the inlet port projecting into the valve chamber, said inlet port including a passage through which fluids can flow into the valve chamber;
   an outlet port mounted in the housing, a portion of the outlet port projecting into the valve chamber, said outlet port including a passage through which fluids can flow into the valve chamber, the outlet port being a substantial duplicate of the inlet port and the portions of the inlet port and the outlet port projecting into the valve chamber being spaced apart a predetermined distance from each other;
   seal means mounted on the inner wall means of the valve housing and around the portion of the inlet port projecting into the valve chamber;
   valve cap means movably mounted on the inlet port, said valve cap means having a free edge and a first and a second position, said valve cap means in its first position contacting the portion of the outlet port projecting into the valve chamber to permit fluids to flow through the passage of the inlet port through the valve chamber and into the outlet port; the free edge of the valve cap means engaging the seal means to prevent fluids from flowing from the outlet port through the valve chamber into the passage of the inlet port when the valve cap means is in its second position; the only forces acting to move the valve cap between its first and second positions being do to accelerations to which the valve is subjected and the difference between the pressure of the fluid in the valve space and the pressure of the fluid in the passage of the inlet port.

2. The one way valve of claim 1 in which the valve cap means in its second position fully encloses the portion of the inlet port projecting into the valve chamber.

3. The one way valve means of claim 2, in which the the valve cap means in its first position partially encloses the inlet port projecting into the valve chamber.

4. A one way valve comprising:
   a valve housing having wall means having inner surfaces defining a valve space within said housing, at least two portions of the inner surfaces of the wall means defining inner planar surfaces which are substantially parallel to each other;
   a pair of ports mounted in said valve housing in communication with the valve space for permitting fluids to flow into and out of the valve space through the ports, one of said ports being an inlet port and the other an outlet port, said inlet and outlet ports being substantially structurally identical;

each of said ports having wall means forming an inner cylindrical portion projecting into the valve space, said cylindrical portion of the ports having a diameter, the inlet and outlet portions being mounted in the housing so that the cylindrical portion of each intersects and is substantially perpendicular to a different one of the inner planar surfaces of the wall means of the valve housing and are spaced apart a fixed distance;

a plurality of orifices formed in the wall means of the inner cylindrical portions of the ports a cup shaped valve cap having a bore and cylindrical side walls forming a cylindrical space having a diameter which is greater than the diameter of the inner portion of the ports, said cup shaped cap being positioned around the inner portion of the the inlet port, said valve cap having two positions, said valve cap in its first position preventing fluid within the valve space from flowing into the inlet port; said cap in its second position uncovering the orifices in the inner portion of the inlet port to permit fluid to flow into the valve space from the inlet port;

the distance between the inner cylindrical portions of the inlet and outlet ports limiting movement of the valve cap with respect to the inlet port so that a portion of the inlet port remains within the cap when the orifices of the inlet port are uncovered by the valve cap when the valve cap is in its second position; the only forces acting to move the valve cap relative to the inlet port being the difference between the pressure of fluid in the valve space and the pressure of the fluid in the passage of the inlet port and that do to gravity.

5. The one way valve of claim 4 in which when the valve cap is in its first position, a free end of the valve cap contacts a seal mounted on the inner planar surface of the wall means of the of the valve housing around the inner cylindrical portion of the inlet port.

6. The one way valve of claim 5 in which the seal has a substantially planar surface and the free end of the valve cap is also substantially planar.

7. A one way valve comprising:

a valve body member having a base and side walls, said base and side walls having inner surfaces, an inner surface of the base being substantially planar;

a cover plate member having an inner planar surface mounted on the valve body, the inner surfaces of the base and side wall of the valve body and of the cover plate defining a cylindrical valve space having an axis of symmetry;

a port mounted in the base of the valve body and a port mounted in the cover plate, each of said ports having passage means permitting fluids entrance to and egress from the valve space, each port having wall means having an inner portion which projects into the valve space, the inner portion of each port having a cylindrical outer surface and and a planar face, each of the ports having an axis of symmetry, the ports being mounted on the valve body or the cover plate so that the axes of symmetry of the ports substantially coincide with the axis of symmetry of the the valve space, one of said ports being an inlet port and the other being an outlet port;

a valve cap having a base and a side wall, the side wall having a free end, the inner surfaces of the base and side wall forming a cylindrical space of slightly greater diameter than the diameter of the inner portion of the ports, the depth of the cylindrical space within the cap being greater than the distance the inner portion of the inlet port projects into the valve space, said valve cap being positioned on the inlet port so that the inner portion of the inlet port projects into the cylindrical space of the valve cap;

seal means mounted on the inner planar surface of the member on which the inlet port is mounted, and around the inlet port;

the valve cap being movable substantially parallel to the axis of symmetry between a first and a second position, the free end of the cap in its first position engaging the seal means to prevent fluids from flowing from the valve space through the passage means of the inlet port to exit the valve, and the valve cap in its second position uncovering the passage means in the inner portion of the inlet port to permit the flow of fluid through the passage means in the inlet port into the valve space, the position of the face of the outlet port in the valve space defining the second position of the valve cap so that a portion of the inlet port is positioned within the cylindrical space of the valve cap when the valve cap is in its second position, the only forces acting to move the valve cap relative to the ports resulting from accelerations to which the valve is subjected having a component parallel to the axis of symmetry of the valve and the difference between the pressure of a fluid in the valve space and the pressure of the fluid in the inlet port.

* * * * *